(12) United States Patent
Manjeshwar et al.

(10) Patent No.: US 8,667,116 B2
(45) Date of Patent: Mar. 4, 2014

(54) METHOD AND SYSTEM FOR PROVIDING RELIABLE COMMUNICATION WITH REDUNDANCY FOR ENERGY CONSTRAINED WIRELESS SYSTEMS

(75) Inventors: Arati Manjeshwar, Chandler, AZ (US); Falk Herrmann, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 1750 days.

(21) Appl. No.: 11/241,300

(22) Filed: Sep. 30, 2005

(65) Prior Publication Data
US 2007/0076731 A1  Apr. 5, 2007

(51) Int. Cl.
*G06F 15/173* (2006.01)

(52) U.S. Cl.
USPC .......... 709/224; 340/3.1; 340/3.51; 370/221; 370/310; 370/432; 379/92.01; 455/7; 700/82; 714/4.11

(58) Field of Classification Search
USPC .......... 709/200, 224; 340/3.1, 3.51; 370/221; 370/310, 432; 379/92.01; 455/7; 700/82; 714/4.11
See application file for complete search history.

(56) References Cited

U.S. PATENT DOCUMENTS

| | | | | |
|---|---|---|---|---|
| 5,673,252 | A | * | 9/1997 | Johnson et al. ............... 370/449 |
| 6,400,281 | B1 | | 6/2002 | Darby et al. |
| 6,763,479 | B1 | * | 7/2004 | Hebert .......................... 714/4.11 |
| 7,068,992 | B1 | * | 6/2006 | Massie et al. ................. 455/403 |
| 7,536,194 | B2 | * | 5/2009 | Manjeshwar et al. ......... 455/515 |
| 2002/0072329 | A1 | * | 6/2002 | Bandeira et al. ................... 455/7 |
| 2002/0176355 | A1 | * | 11/2002 | Mimms et al. ................ 370/216 |
| 2004/0044452 | A1 | * | 3/2004 | Bauer et al. ...................... 701/33 |
| 2004/0083403 | A1 | * | 4/2004 | Khosravi ......................... 714/13 |
| 2004/0160916 | A1 | * | 8/2004 | Vukovic et al. ............... 370/332 |
| 2004/0165532 | A1 | * | 8/2004 | Poor et al. ..................... 370/238 |
| 2005/0100038 | A1 | | 5/2005 | Pietraski |
| 2006/0107086 | A1 | * | 5/2006 | Walker et al. ...................... 714/4 |
| 2006/0159118 | A1 | * | 7/2006 | Shvodian et al. ............. 370/449 |
| 2006/0202854 | A1 | * | 9/2006 | Spencer ................... 340/870.02 |
| 2007/0076740 | A1 | * | 4/2007 | Manjeshwar ................. 370/432 |
| 2007/0258508 | A1 | * | 11/2007 | Werb et al. .................... 375/140 |
| 2008/0276135 | A1 | * | 11/2008 | Granath .......................... 714/57 |
| 2008/0291822 | A1 | * | 11/2008 | Farkas et al. .................. 370/216 |
| 2011/0038315 | A1 | * | 2/2011 | Frei et al. ...................... 370/328 |
| 2011/0038376 | A1 | * | 2/2011 | Wiemann et al. ............. 370/394 |
| 2012/0039218 | A1 | * | 2/2012 | Palchaudhuri et al. ........ 370/256 |

OTHER PUBLICATIONS

European Search Report for EP 06 02 0090, Date Feb. 13, 2007.

* cited by examiner

*Primary Examiner* — Oleg Survillo

(74) *Attorney, Agent, or Firm* — Kenyon & Kenyon LLP

(57) ABSTRACT

A method and apparatus is provided to supervise a network, in which a first device supervises a network node element, and a second device partially supervises the network node element.

23 Claims, 2 Drawing Sheets

METHOD AND SYSTEM FOR PROVIDING RELIABLE COMMUNICATION WITH REDUNDANCY FOR ENERGY CONSTRAINED WIRELESS SYSTEMS

CROSS REFERENCE TO RELATED APPLICATIONS

This application is related to U.S. patent application Ser. No. 11/239,836 filed Sep. 30, 2005, and which issued on Nov. 3, 2009 as U.S. Pat. No. 7,613,146; U.S. patent application Ser. No. 11/239,837 filed Sep. 30, 2005, and which issued on May 19, 2009 as U.S. Pat. No. 7,536,194; U.S. patent application Ser. No. 11/240,401 filed Sep. 30, 2005; U.S. patent application Ser. No. 11/240,434 filed Sep. 30, 2005; U.S. patent application Ser. No. 11/240,436 filed Sep. 30, 2005, and which issued on Sep. 16, 2008 as U.S. Pat. No. 7,426,190; U.S. patent application Ser. No. 11/240,545 filed Sep. 30, 2005; U.S. patent application Ser. No. 11/241,296 filed Sep. 30, 2005; U.S. patent application Ser. No. 11/241,298 filed Sep. 30, 2005; and U.S. patent application Ser. No. 11/241,639 filed Sep. 30, 2005. The disclosure of each of the foregoing related applications is hereby incorporated by reference herein in its entirety.

FIELD OF THE INVENTION

The present invention relates to a method and system for supervising energy constrained network node elements of a wireless network.

BACKGROUND

In certain communication systems it may be required that every node in the system be supervised to make sure it is operational and can communicate with other devices and/or other network elements. Since communication may be resource expensive, each device may be supervised by only one other device. However, if this other device malfunctions, then it may be difficult to determine the status of the devices that are supervised by the malfunctioning device. This problem may be handled, for example, by having redundancy, but such redundancy may require additional resources and/or complexity.

In certain wireless communication systems, transmitting is more energy expensive than receiving, or in other words, transmitting is more "energy hungry" than receiving, that is, on average it may require more energy to transmit messages than to receive messages. If, for example, the wireless media is a broadcast media then the transmitting device must ensure that its transmission is received by all intended receiver devices when these receiver devices are ready and able to receive the transmission, whereas the receiver devices may merely be required to listen and receive the transmission with minimal expended energy.

SUMMARY OF THE INVENTION

An exemplary embodiment and/or exemplary method of the present invention provides a method and system for improved efficiency for network supervision, including, for example, network supervision of energy constrained devices of a network system. The present invention may be used, for example, in wired or wireless systems.

According to an exemplary embodiment and/or exemplary method of the present invention, each device of a network is supervised by a first device and partially supervised by a second device. Having an additional device to "partially" supervise the first device, rather than "fully" supervise the first device may be more resource efficient. In this regard, the additional device may be configured, for example, only to receive and forward any error messages with other messages the additional device is otherwise configured and/or required to send. The additional device may also be configured not to acknowledge or forward any other non-error message of the device it is partially supervising.

An exemplary embodiment and/or exemplary method of the present invention is directed to an apparatus to supervise a network, which includes a first device to supervise a network node element, and a second device to partially supervise the network node element.

Another exemplary embodiment and/or exemplary method of the present invention is directed to an apparatus to supervise a network, in which the second device forwards an error message transmitted by the network node element to a higher level node in the network if the first device does not forward the error message.

Yet another exemplary embodiment and/or exemplary method of the present invention is directed to an apparatus to supervise a network, in which the second device ignores non-error message from the network node element.

Still another exemplary embodiment and/or exemplary method of the present invention is directed to an apparatus to supervise a network, in which the second device appends the error message to a another message.

Yet another exemplary embodiment and/or exemplary method of the present invention is directed to an apparatus to supervise a network, in which at least one of the first device, the second device, the network node element, and the higher level are energy constrained devices.

Still another exemplary embodiment and/or exemplary method of the present invention is directed to an apparatus to supervise a network, in which at least one of the first devices, the second device, the network node element, and the higher level node are energy constrained wireless devices.

Yet another exemplary embodiment and/or exemplary method of the present invention is directed to an apparatus to supervise a network, in which the second device is configured to supervise another network node element.

Still another exemplary embodiment and/or exemplary method of the present invention is directed to an apparatus to supervise a network, in which the first device is configured to partially supervise another network node element.

Yet another exemplary embodiment and/or exemplary method of the present invention is directed to an apparatus to supervise a network, in which the second device is configured to supervise another network node element and the first device is configured to partially supervise the another network node element.

An exemplary embodiment and/or exemplary method of the present invention is directed to a method of supervising a network node element, the method including providing a first device to supervise a network node element, and providing a second device to partially supervise the network node element, Another exemplary embodiment and/or exemplary method of the present invention is directed to a method of supervising a network node element, the method including polling, by the first device, a status of the network node element, and forwarding, by the second device, an error message transmitted by the network node element to a higher level node in the network if the first device does not forward the error message.

Yet another exemplary embodiment and/or exemplary method of the present invention is directed to a method of supervising a network node element, the method including ignoring, by the second device, non-error messages from the network node element.

Still another exemplary embodiment and/or exemplary method of the present invention is directed to a method of supervising a network node element, the method including appending, by the second device the error message to another message.

Yet another exemplary embodiment and/or exemplary method of the present invention is directed to a method of supervising a network node element, the in which at least one of the first device, the second device, the network node element, and the higher level are energy constrained devices.

Still another exemplary embodiment and/or exemplary method of the present invention is directed to a method of supervising a network node element, in which at least one of the first devices, the second device, the network node element, and the higher level node are energy constrained wireless devices.

Yet another exemplary embodiment and/or exemplary method of the present invention is directed to a method of supervising a network node element, in which the second device is configured to supervise another network node element.

Still another exemplary embodiment and/or exemplary method of the present invention is directed to a method of supervising a network node element, in which the first device is configured to partially supervise another network node element.

Yet another exemplary embodiment and/or exemplary method of the present invention is directed to a method of supervising a network node element, in which the second device is configured to supervise another network node element and the first device is configured to partially supervise the another network node element.

An exemplary embodiment and/or exemplary method of the present invention is directed to a method of supervising a network node element, the method including aggregating, by the first device, non-error messages from the network node element.

An exemplary embodiment and/or exemplary of the present invention is directed to a method of supervising a network node element, the method including providing a first device to supervise a network node element, providing a second device to partially supervise the network node element, polling, by the first device, a status of the network node element; aggregating, by the first device, non-error messages from the network node element, forwarding, by the second device, an error message transmitted by the network node element to a higher level node in the network if the first device does not forward the error message, appending, by the second device, the error message to another message, and ignoring, by the second device, non-error messages from the network node element, in which at least one of the first device, the second device, the network node element, and the higher level are energy constrained wireless devices.

DETAILED DESCRIPTION

Figure 1:
FIG. 1 shows exemplary network node elements of a wireless network, in which one network node element supervises another network node element.

FIG. 1 shows exemplary network node elements A and B of a wireless network, in which network node element A supervises network node element B. In this regard, to supervise network node element B, network node element A may periodically poll network node element B and receive an acknowledgement with the status of network node element B. If network node element A and network node element B are part of a multihop system, then network node element A may be supervised by another node element.

Figure 2:
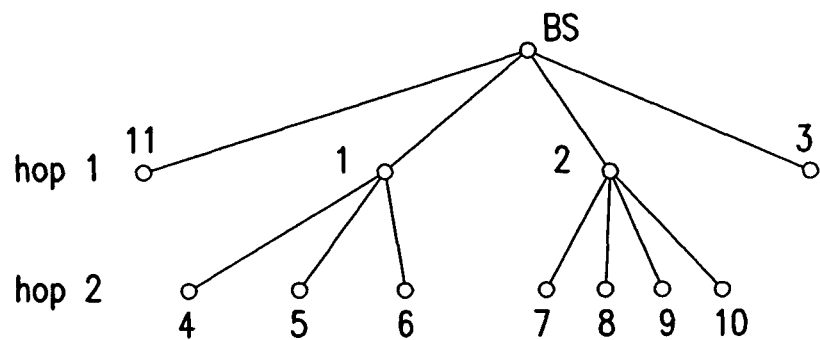
FIG. 2 shows an exemplary multihop network, which includes a base station and node elements arranged in a hierarchical manner to show a supervisory relationship between the base station and the network element nodes, and between the network node elements themselves.

FIG. 2 shows an exemplary multihop network, which includes a base station BS and node elements 1 through 11 arranged in a hierarchical manner, where a solid line (also referred to as an edge) connecting two network node elements indicates a supervisory relationship between the two element nodes. In particular, the base station BS is configured to supervise node elements 1, 2, 3, and 11, node element 1 is configured to supervise node elements 4, 5 and 6, and node element 2 is configured to supervise node elements 7, 8, 9 and 10. Node elements 3 and 11 are not configured to supervise other node elements.

The base station BS and node elements 1 through 11 of FIG. 2 form a multihop system. In this regard, node elements 1, 2, 3 and 11 may be referred to as "hop 1" nodes, and node elements 4 through 10 may be referred to as "hop 2" nodes. Hence, in FIG. 2 the base station BS supervises the hop 1 nodes, and the hop 1 nodes supervise the hop 2 nodes.

According to an exemplary embodiment and/or exemplary method of the present invention, to supervise node elements 4, 5 and 6, node element 1 polls and/or listens for the status of each of the node elements 4, 5 and 6, and passes the status of each node element to the base station BS. Now, if node element 1 fails, the base station BS will not be notified by node element 1 of the status of node elements 4, 5 and 6. Redundancy in supervision may be provided to accommodate for the failure of node element 1, but if an additional node element is provided to supervise these node elements additional resources may be consumed during normal operation if node element 1 does not fail. For example, if an additional node element is provided to supervise node elements 4, 5, and 6, and if node element 1 does not fail, then during normal operation the status of each node element 4, 5, and 6 is passed twice to the base station BS—once by node element 1 and once by the additionally provided supervising node element.

In wireless systems, it may be assumed that transmitting is usually more "energy hungry" than receiving so that on average more energy may be required to transmit messages than to receive messages. It also may be assumed that more than one node element can hear every node element, and that every supervising node element can distinguish an "OK" status from a "NOT OK" status. So, for an energy constrained system the following arrangement may be more efficient.

Figure 3:
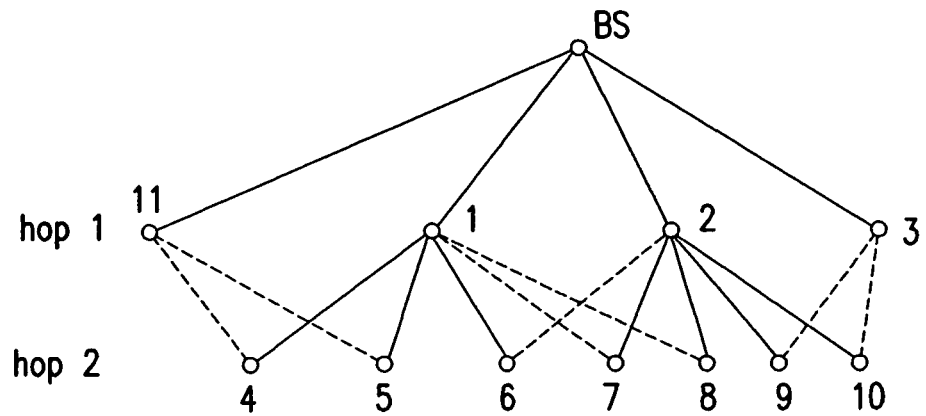
FIG. 3 shows an exemplary multihop network, which includes a base station and node elements arranged in a hierarchical manner to show a supervisory or partially supervisory relationship between base and the network node elements, and between the network node elements themselves.

FIG. 3 shows an exemplary multihop network, which includes a base station BS and node elements 1 through 11 arranged in a hierarchical manner, where a solid line connecting two network node elements (also referred to as an "edge")

indicates a supervisory relationship between the node elements, and a dotted line connecting two node elements indicates a partial supervisory relationship between the node elements. In particular, solid lines connecting the base station BS and node elements 1, 2, 3 and 4 indicates that the base station BS supervises node elements 1, 2, 3 and 11, solid lines connecting node element 1 and node elements 4, 5 and 6 indicate that node element 1 supervises node element 4, 5 and 6, and solid lines between node element 2 and node elements 7, 8, 9 and 10 indicate that node element 2 supervises node elements 7, 8, 9 and 10. Moreover, dotted lines connecting node element 11 and node elements 4 and 5 indicate that node element 11 partially supervises node elements 4 and 5, dotted lines connecting node element 1 and node elements 7 and 8 indicate that node element 1 partially supervises node elements 7 and 8, and dotted lines connecting node element 3 and node elements 9 and 10 indicate that node element 3 partially supervises node elements 9 and 10. Here again, it is noted that the base station BS and node elements 1 through 11 form a multihop system. In this regard, node elements 1, 2, 3 and 11 may be referred to as "hop 1" nodes, and node elements 4 through 10 may be referred to as "hop 2" nodes. Hence, in addition to supervising certain hop 2 nodes as indicated by solid lines, the hop 1 nodes each also partially supervise certain other hop 2 nodes as indicated by dotted lines.

Since wireless media may be implemented as a broadcast media, having an additional device that partially supervises a device, which is fully supervised by another device, may be energy efficient. In this regard, the additional device does not poll or react to acknowledgments of its partially supervised nodes or forward any "OK" status from the partially supervised nodes. Instead, the additional device may react when a node it partially supervises fails to send its "OK" status at the appropriate time. For example, in FIG. 3, node element 1 partially supervises node elements 7 and 8. Accordingly, when node element 2 polls node element 7, node element 1 is also listening, and when node 7 acknowledges with the status, node element 1 is also listening. If node element 1 hears an "OK" status from node element 7, it does not take any action (i.e., it does not inform the base station BS about the status of node element 7). However, if node element 1 does not hear an "OK" status from node element 7, it informs "NOT-heard" status to the base station BS when polled.

In this regard, since node element 1 is not polling node element 7, it does not spend extra energy to transmit. Therefore, since the node elements are expected to be normally in "OK" status, most of the time node element 1 does not send extra data to the base station BS. Accordingly, energy is conserved. Furthermore, if node element 1 appends the status regarding the node elements it partially supervises to a message it would otherwise send to the base station BS there may be no need for additional communication. Moreover, additional redundancy may not be required since if node element 2 fails or if the communication between the base station BS and node element 2 is bad, the status of node elements 7 and 8 (and subtrees below node elements 7 and 8) is still forwarded. Moreover still, the link from node element 1 to node element 7 need not be bi-directional, that is, only node element 1 may be required to hear node element 7 so that it may be non-critical if node element 7 cannot hear node element 1. Although, extra energy may be spent by node element 1 to listen to node element 7, depending on the transceiver this may be minimal. Should node element 7 fail, extra bytes of information may be sent to the base station BS.

Figure 4:
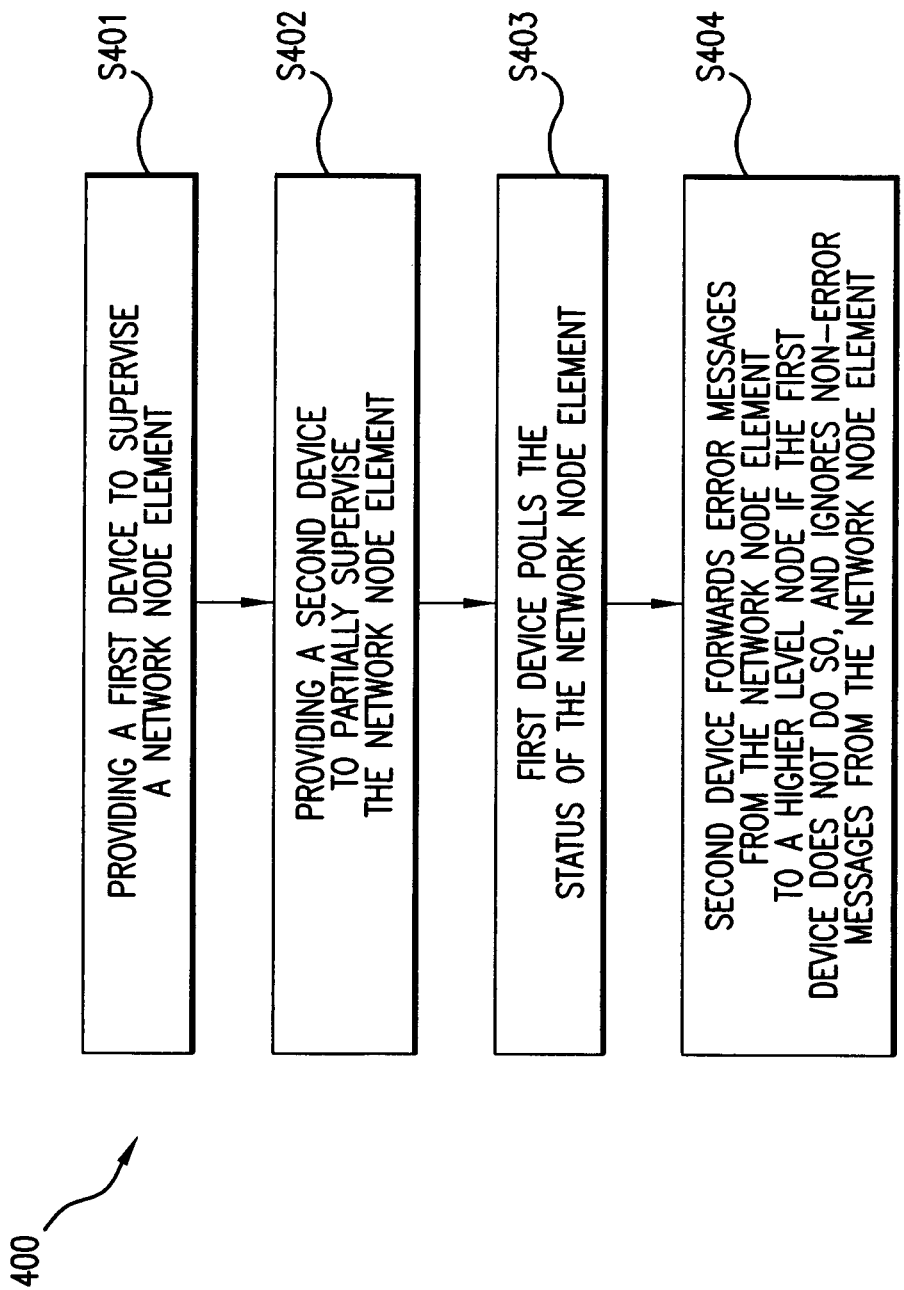
FIG. 4 shows an exemplary method for supervising a network node element, in which a first device is provided to supervise the network node element and a second device is provided to partially supervise the network node element.

FIG. 4 shows an exemplary method 400 for supervising a network node element, in which a first device is provided to supervise the network node element and a second device is provided to partially supervise the network node element. In this regard, the network node element may be, for example, a wireless sensor node.

In steps S401 and S401, the first device is provided to supervise the network node element, and the second device is provided to partially supervise the network node element. In this regard, the first and second devices may be, for example, other network node elements, which are arranged in a hierarchical manner to receive messages from the network node element and forward, if required, the messages to other network node elements.

In steps S403 and S404, the first device polls the status of the network node element, and the second device forwards the message from the network node element to a higher level node if the message is an error message and if the first device does not forward this error message to the higher level node. In this regard, the second device ignores non-error messages from the network node element, or error messages that have been already forwarded to the higher level node by the first device.

According to an exemplary embodiment and/or exemplary method of the present invention, the reporting of status by network nodes may be aggregated so that less overall data may be transmitted in the network, transmission energy and/or bandwidth may be saved, and the packet size of the transmission between nodes at different levels of the tree hierarchy may not unnecessarily increase in an exponential manner. For example, node element 1 of the exemplary multihop network of FIG. 3, which supervises node elements 4 and 5, and partially supervises node elements 7 and 8, may aggregate the reporting of status of node elements 4 and 5 collectively rather than individually (node element may also aggregate the reporting of status of node elements 7 and 8 since the status of partially supervised nodes may also be aggregated). Accordingly, when node element 1 reports an "OK" status to a higher level node it is interpreted that node element 1 and all node elements within its subtree and below (i.e., node elements 4 and 5) have an "OK" status. In this regard, since a node element may be supervised by more than one node element (e.g., two node supervising node elements—one node element to fully supervise and one node element to partially supervise) an inconsistency in reporting data may arise in which conflicting information regarding a particular node element is sent by two node elements assigned to supervise the same node element. For example, in FIG. 3, node element 7 is partially supervised by node element 1 and fully supervised by node element 2. It may occur, for example, that node element 1 does not receive a status indication from node element 7, in which case node element 1 reports "NOT HEARD" with respect to the status of node element 7, whereas node element 2, by contrast, does receive an "OK" status indication from node element 7 and therefore reports "OK". In this instance, where conflicting information is received about node element 7, the higher level node element will assume that the communication link between node element 1 and node element 7 is not functioning as well as the communication link between node element 2 and node element 7 so therefore an "OK" status of node element 7 and its subtree is also assumed. Likewise if the situation were reversed and node element 1 received an "OK" status from node element 7, and node element 2 did not receive status from node element 7, the higher level node element will assume that the communication link between node element 2 and node element 7 is less functional that the communications link between node element 1 and node element 7 so therefore an "OK" status of node element 7 and its subtree is again assumed. Accordingly, in general, an "OK" status is accepted if at one of the node elements assigned to supervise the particular node element reports an "OK" status. Also, should node element 1 report a "NOT HEARD" status with respect to node element 7, and node element 2 reports a "SENSOR FAULTY" status then the "SENSOR FAULTY" status is assumed.

What is claimed is:

1. A method of supervising a network node element of a network, comprising:
   supervising, by a first hardware device, the network node element by polling for a status of, and listening for an acknowledgement from, the network node element, wherein the acknowledgement includes either an error message or an OK status, depending on whether an error occurred within the network node element; and
   for partial supervision of the network node element:
      listening, by a second hardware device, for the acknowledgement from the network node element;
      determining, in a first determining step and by the second hardware device, whether the acknowledgement includes the error message; and
      determining, in a second determining step and by the second hardware device, whether to take a responsive action in response to the acknowledgement based on the determining of whether the acknowledgement includes the error message;
   wherein:
      no responsive action is taken in response to the acknowledgement if the determination in the first determining step is that the acknowledgement includes the OK status, and responsive action is taken in response to the acknowledgement if the determination in the first determining step is that the acknowledgement includes the error message;
      the second hardware device is not configured to poll for the status of the network node element; and
      the responsive action includes forwarding the error message to a higher level node in the network in response to determining, at the second hardware device, that the first hardware device failed to forward the error message to the higher level node.

2. The method of claim 1, wherein the responsive action includes appending, by the second hardware device the error message to a message it would otherwise send to the higher level node in the network.

3. The method of claim 1, wherein at least one of the first hardware device, the second hardware device, the network node element, and the higher level node are energy constrained devices.

4. The method of claim 1, wherein at least one of the first hardware device, the second hardware device, the network node element, and the higher level node are energy constrained wireless devices.

5. The method of claim 1, wherein the second hardware device is configured to supervise another network node element.

6. The method of claim 1, wherein the first hardware device is configured to partially supervise another network node element.

7. The method of claim 1, wherein the second hardware device is configured to supervise another network node element and the first hardware device is configured to partially supervise the another network node element.

8. The method of claim 1, further comprising:
   aggregating by the first hardware device a plurality of acknowledgements including the OK status from the network node element and other network node elements within a subtree of the network.

9. A method of supervising a network node element of a network, comprising:
   supervising, by a first hardware device, the network node element by polling for a status of, and listening for an acknowledgement from, the network node element;
   for partial supervision of the network node element:
      listening, by a second hardware device, for the acknowledgement from the network node element;
      determining, in a first determining step and by the second hardware device, which of an error message and an OK status is included in the acknowledgement; and
      determining, in a second determining step and by the second hardware device, whether to take a responsive action in response to the acknowledgement based on the determination of the first determining step, wherein no responsive action is taken in response to the acknowledgement if the determination in the first determining step is that the acknowledgement includes the OK status, and responsive action is taken in response to the acknowledgement if the determination in the first determining step is that the acknowledgement includes the error message; and
   aggregating, by the first hardware device, a plurality of acknowledgements that include the OK status;
   wherein:
      the responsive action includes forwarding, by the second hardware device, the error message to a higher level node in the network in response to determining, at the second hardware device, that the first hardware device failed to forward the error message, the forwarding being performed by appending the error message to a message the second hardware device would otherwise send to the higher level node in the network;
      at least one of the first hardware device, the second hardware device, the network node element, and the higher level node are energy constrained wireless devices; and
      the second hardware device is not configured to poll for the status of the network node element.

10. An apparatus to supervise a network node element of a network, comprising:
   a first hardware device configured to supervise the network node element by polling for a status of, and listening for an acknowledgement from, the network node element, wherein the acknowledgement includes either an error message or an OK status, depending on whether an error occurred within the network node element; and
   a second hardware device that is not configured to poll for the status of the network node element and that, for partial supervision of the network node element, is configured to:
      listen for the acknowledgement from the network node element;
      determine whether the acknowledgement includes the error message;
      take no action in response to the acknowledgement where the determination is that the acknowledgement includes the OK status; and
      take a responsive action to the acknowledgement where the determination is that the acknowledgement includes the error message, wherein the responsive action includes forwarding the error message to a higher level node in the network in response to determining, at the second hardware device, that the first hardware device failed to forward the error message to the higher level node.

11. The apparatus of claim 10, wherein the second hardware device appends the error message to a message it would otherwise send to the higher level node in the network.

12. The apparatus of claim 10, wherein at least one of the first hardware device, the second hardware device, the network node element, and the higher level node are energy constrained devices.

13. The apparatus of claim 10, wherein at least one of the first hardware device, the second hardware device, the network node element, and the higher level node are energy constrained wireless devices.

14. The apparatus of claim 10, wherein the second hardware device is configured to supervise another network node element.

15. The apparatus of claim 10, wherein the first hardware device is configured to partially supervise another network node element.

16. The apparatus of claim 10, wherein the second hardware device is configured to supervise another network node element and the first hardware device is configured to partially supervise the another network node element.

17. The apparatus of claim 10, wherein the first hardware device is configured to forward the acknowledgement to the higher level node.

18. The apparatus of claim 10, wherein the second hardware device forwards the error message in response to a polling by the higher level node.

19. The apparatus of claim 18, wherein the second hardware device responds to the polling of the higher level node only if the network node element transmitted the error message.

20. The apparatus of claim 10, wherein the network is a multihop network.

21. The apparatus of claim 10, wherein a link from the second hardware device to the network node element is unidirectional.

22. The apparatus of claim 21, wherein a link from the first hardware device to the network node element is bidirectional.

23. The apparatus of claim 10, wherein the first hardware device forwards the OK status acknowledgements transmitted by the network node element to the higher level node.

* * * * *